United States Patent [19]

Rodgers

[11] Patent Number: 5,090,155
[45] Date of Patent: Feb. 25, 1992

[54] SEEDLING PROTECTOR

[76] Inventor: Mark Rodgers, P.O. Box 853, Fortuna, Calif. 95540

[21] Appl. No.: 618,512

[22] Filed: Nov. 21, 1990

Related U.S. Application Data

[63] Continuation of Ser. No. 389,609, Aug. 4, 1989, abandoned.

[51] Int. Cl.$^5$ .............................................. A01G 13/02
[52] U.S. Cl. ........................................ 47/30; 47/28.1
[58] Field of Search ............... 47/26, 30, 21, 45, 28.1, 47/29, 31

[56] References Cited

U.S. PATENT DOCUMENTS

| | | | |
|---|---|---|---|
| 645,890 | 3/1900 | Conrad | 47/21 |
| 1,060,116 | 4/1913 | Oters | 47/30 |
| 1,126,426 | 1/1915 | Eddy | 47/21 |
| 1,324,668 | 12/1919 | Harris | 47/30 |
| 2,996,842 | 8/1961 | Weston | 47/30 |
| 3,816,959 | 6/1974 | Nalle, Jr. | 47/27 |
| 4,559,381 | 12/1985 | Tapia et al. | 47/29 |
| 4,895,904 | 1/1990 | Allingham | 47/29 |

FOREIGN PATENT DOCUMENTS

| | | | |
|---|---|---|---|
| 106059 | 11/1926 | Austria | 47/30 |
| 655207 | 4/1929 | France | 47/30 |
| 67694 | 3/1915 | Hungary | 47/30 |
| 2129664 | 5/1984 | United Kingdom | 47/30 |

Primary Examiner—David A. Scherbel
Assistant Examiner—Michele A. Van Patten
Attorney, Agent, or Firm—Nixon & Vanderhye

[57] ABSTRACT

A seedling protector consisting of a shade tube constructed of one or more shading materials each having a shade factor to facilitate protection of plants from solar radiation. A support tube may be provided to support the shade tube and a stake may be provided which may be driven into the ground to hold the seedling protector in position about a plant.

21 Claims, 2 Drawing Sheets

SEEDLING PROTECTOR

This is a continuation of application Ser. No. 07/389,609, filed Aug. 4, 1989, now abandoned.

BACKGROUND OF THE INVENTION

1. Field of the Invention

The present invention relates generally to the area of horticulture, more specifically to a method of protecting young trees known as seedlings from strong solar radiation, and more particularly to a seeding protector which consists substantially of a tube or partial tube utilizing shading material having a predetermined shade factor designed to protect seedlings from intense summer sun and heat.

2. Description of the Prior Art

Past inventors have directed their efforts toward plant protectors, including paper bags and the like, designed to protect small plants from cold spring nights just after planting, as well as tree protectors constructed of plastic mesh or metal screen and the like, designed to minimize the likelihood of destruction by rodents or deer. Such devices have also included the use of chicken wire and the like to minimize the likelihood that deer will chew the trunk of the tree. Some such protectors have consisted of extruded plastic plant protectors, while others have included biodegradable root protectors. None of the prior art of which the applicant is aware has taught a seedling support having the unique features as taught in the present invention.

SUMMARY OF THE INVENTION

The present invention consists generally of a seedling support which may be constructed utilizing a tube constructed of a photodegradable polyolefin or similar type material with a stake attached thereto to hold the tube upright. The photodegradable polyolefin is chosen such that it has a particular shade factor so that, when it is positioned about a seedling, a predetermined percentage of damaging solar radiation is prohibited from reaching the seedling. The seedling's support may be constructed utilizing the shading material just discussed or utilizing a combination of a tube constructed of photodegradable polyolefin or the like or other structurally strong material with a stake attached thereto, into which the shade tube fits and upon which the shade tube depends for support. The shade tube may be constructed utilizing a high shade section near the ground, a medium shade section positioned just above the high shade section and a low shade section positioned near the top of the seedling support. Both the support tube and the shade tube may be constructed of photodegradable material so that they disintegrate over a period of one to four years, leaving the seedling in an open area after that time. During the protective period, the shade tube protects the seedling from sun and the support tube protects it from deer and rodents.

One of the objects of the present invention is to provide a seedling protector which minimizes the likelihood of damage to a seedling from intense solar radiation.

Another object of the present invention is to provide protection from deer for the seedling.

Another object of the present invention is to provide a seedling protector which includes a support tube to protect the seedling from deer together with a shade tube designed to minimize the likelihood of damage from solar radiation.

A further object of the present invention is to provide an inexpensive seedling protector in which both the support tube and the shade tube are constructed of a photodegradable material so that they substantially disintegrate over a period of one to four years.

Another object of the present invention is to decrease overall seedling protection cost and overall seedling mortality rate.

The foregoing objects, as well as other objects and benefits of the present invention, are made more apparent by the descriptions and claims which follow.

DESCRIPTION OF THE PREFERRED EMBODIMENT

Figure 1:
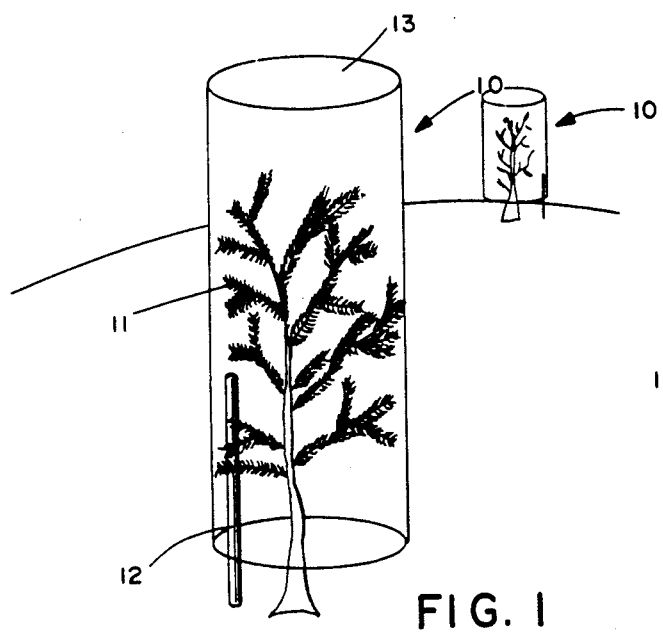
FIG. 1 is a perspective view showing an outline of the seedling protector of the present invention protecting a tree.

FIG. 1 of the drawings is a perspective view of the seedling protector 10 of the present invention. For purposes of illustration, only the outline of seedling protector 10 is shown, with the position of a tree 11 inside the interior 13 of seedling protector 10 revealed. Seedling protector 10 is positioned over a tree 11 and held substantially rigidly in position by positioning means such as stake 12.

Figure 2:
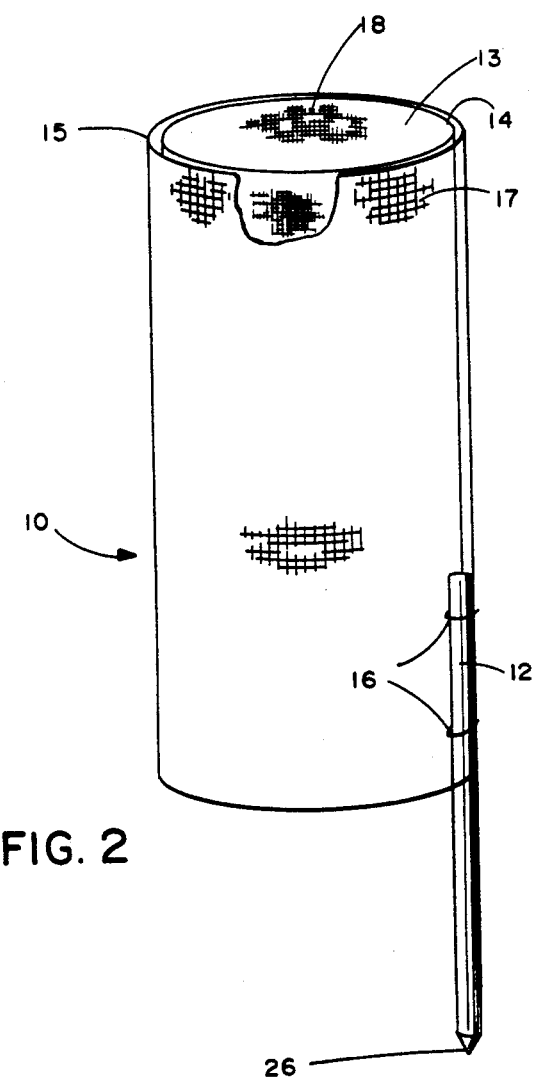
FIG. 2 is a perspective view of the seedling protector of the present invention showing its construction.

FIG. 2 of the drawings is a perspective view showing the positioning of the shade tube 14 with respect to support tube 15, resulting in a seedling protector 10 as shown in FIG. 1 of the drawings. Support tube 15 is hollow so that shade tube 14 fits inside support tube 15. Shade tube 14 may be a full or partial tube covering 360 degrees or less of support tube 15. Support tube 15 may be constructed of wire mesh as shown by support grid 17. Alternatively, the support tube 15 may be constructed of extruded photodegradable polyolefin in order to ensure that it will disintegrate over a period of time when exposed to the sun. Shade tube 14 is constructed of shading material which includes first shading material 18 in the form of a tube to provide an open interior 13 into which a tree 11 as shown in FIG. 1 fits. First shading material 18 is provided which has a predetermined shading factor to control the level of solar radiation reaching that portion of the tree protected by first shading material 18. Positioning means such as stake 12 is attached to support tube 15 by means of connecting means 16 such as string, wire, plastic, ties or other sufficiently strong attaching means. Stake 12 may be constructed of wood, metal, plastic or other structurally strong material as well as photodegradable material, and may include a sharp point 26 as here shown to facilitate penetration into the ground.

Figure 3:
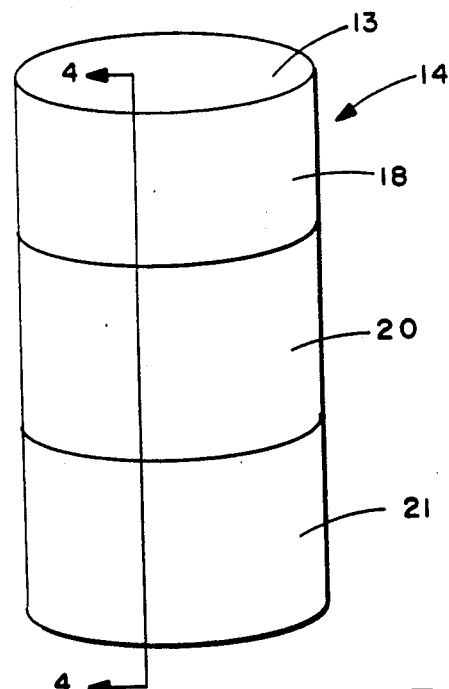
FIG. 3 is a perspective view showing the structure of the shade tube utilized in the seedling protector of the present invention.

FIG. 3 of the drawings is a perspective view of shade tube 14. While shade tube 14 may be constructed of a single piece of shade material—that is, shade material having a particular preset shading factor to control the level of solar radiation passing therethrough, such as first shading material 18, it was found that growth of trees or other plants could be enhanced by constructing shade tube 14 of two or more different levels of shading material to vary the level of solar radiation reaching different parts of the tree at different times. Thus, a high shade section 21 is provided to be positioned near the ground so that a tree receives maximum protection during early stages of growth. A medium shade section 20 may be provided just above high shade section 21 to control solar radiation passing through that portion of shade tube 14. A yet lower level shade section 18 may be provided at the top of shade tube 14 to facilitate control of the amount of solar radiation reaching the top of the tree or other plant so that, as the tree or other plant gets larger and taller and stronger, it reaches lower level shading material, receiving more and more solar radiation to maximize growth. While high shade section 21, medium shade section 20 and lower shade section 18 are shown in FIG. 3 of the drawings, two different shade level sections could be utilized or more than three could be utilized to match the conditions desired for a particular plant.

Figure 4:
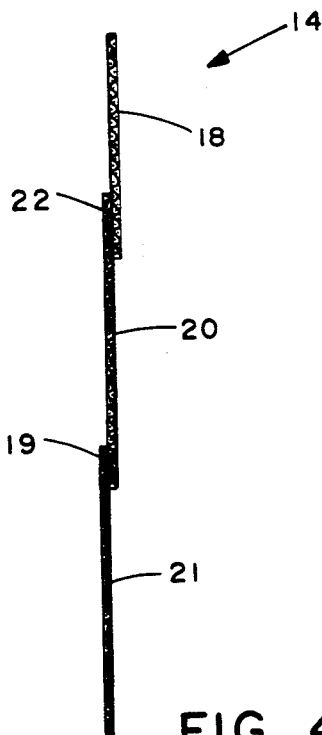
FIG. 4 is a cross-sectional view taken along lines 4 of FIG. 3 showing the construction of the shade tube of the present invention.

FIG. 4 is a cross-sectional view taken along lines 4 of FIG. 3 illustrating one possible approach to construction of shade tube 14 of the present invention. In this particular embodiment, low level shade section 18 is attached to medium shade level section 20 at point 22 by means of glue or other effective attaching means. Medium shade level section 20 is attached to high shade level section 21 at point 19 by means of glue or other acceptable attaching means. If the shading material being utilized is heat-sensitive so as to be heat-sealable, the different shade level sections may be melted together.

Figure 5:
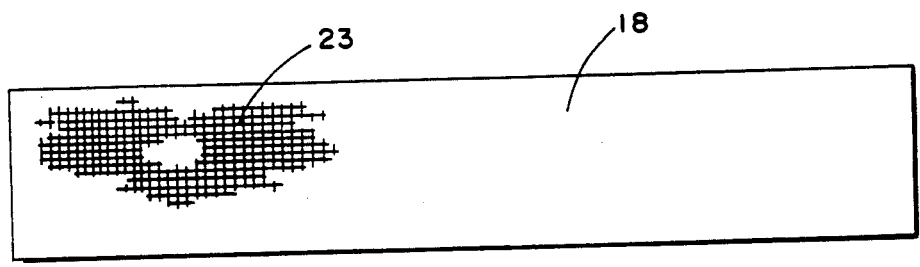
FIG. 5 is a side view showing a piece of shading material which may be utilized in producing shade tube of FIG. 3.
Figure 6:
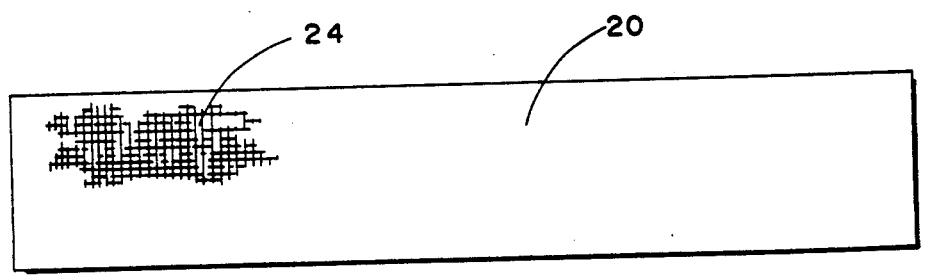
FIG. 6 is a side view showing a piece of shading material which may be utilized in producing shade tube of FIG. 3.
Figure 7:
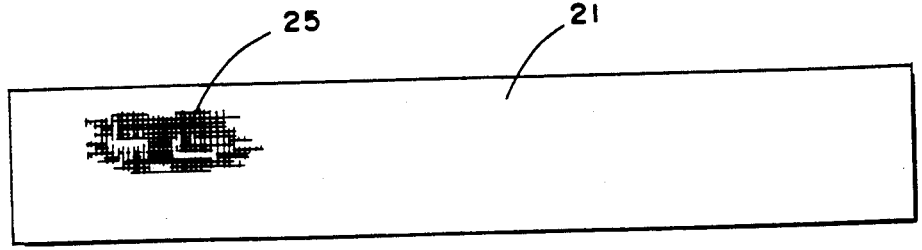
FIG. 7 is a side view showing a piece of shading material which may be utilized in constructing the shade tube of FIG. 3.

FIGS. 5, 6 and 7 of the drawings are side views of different levels of shading material. In particular, low level shade section 18 is shown having a large grid 23 which allows more sunlight to pass through than would be allowed by medium shade level section 20 and high shade level section 21. Likewise, medium shade level section 20 is shown with a medium grid 24 which provides a precontrolled level of solar radiation passing therethrough. High shade level section 21 shows an extremely fine grid 25 which maximizes the blockage of solar radiation, thereby minimizing the likelihood that a tree protected thereby will suffer from heat damage. While shading materials 18, 20 and 21 are here shown constructed of woven material, any shading material formable and meeting desired specifications may be utilized.

While the foregoing description of the invention has shown preferred embodiment(s) using specific terms, such description is presented for illustrative purposes only. It is applicant's intention that changes and variations may be made without departure from the spirit or scope of the following claims, and this disclosure is not intended to limit applicant's protection in any way.

I claim:

1. A seedling protector comprising:

first substantially cylindrical means for providing a predetermined degree of shade protection for a seedling, said first substantially cylindrical means including an open-ended shade tube constructed of a photodegradable polyolefin material having a plurality of grid openings, said openings sized to control amounts of solar radiation passing therethrough; and second substantially cylindrical means for surrounding said shade tube in substantial peripheral engagement therewith, said second means supporting said first means in a substantially upright position.

2. A seedling protector according to claim 1 and further including means for ground anchoring said second means and including one end attached directly to said second means, and another end adapted to be driven into the ground.

3. A seedling protector according to claim 1 wherein said second substantially cylindrical means is substantially coextensive in length with said open-ended shade tube.

4. A seedling protector according to claim 3 wherein said second substantially cylindrical means is of open mesh construction.

5. A seedling protector according to claim 3 wherein said second substantially cylindrical means is constructed of photodegradable material.

6. A seedling protector comprising an open ended substantially cylindrical shade tube for placement about a seedling, said shade tube having a plurality of substantially axially aligned sections, each providing a different degree of shade protection and including a lower section for providing relatively high shade protection and an upper section for providing relatively low shade protection; and a support tube substantially surrounding said shade tube for holding said shade tube substantially upright.

7. A seedling protector according to claim 6 wherein said shade tube is constructed of photodegradable material.

8. A seedling protector according to claim 6 wherein said support tube is in substantial peripheral engagement with said shade tube.

9. A seedling protector according to claim 8 and further including a positioning stake for operative attachment to said support tube.

10. A seedling protector according to claim 9 wherein said support tube and said support stake are constructed of photodegradable, and biodegradable material, respectively.

11. A seedling protector according to claim 6 wherein said support tube is constructed of an open mesh material.

12. A seedling protector according to claim 6 wherein said shade tube includes an intermediate section between said lower and upper sections for providing an intermediate degree of shade protection.

13. A photodegradable seedling protector comprising a shade tube of woven material having open upper and lower ends, said tube comprising an upper section with relatively large size grid openings for effecting a relatively low degree of shade protection; an intermediate section with relatively intermediate size grid openings for effecting a relatively intermediate degree of shade protection; and a lower section with relatively small grid openings for effecting a relatively high degree of shade protection; said lower, intermediate and upper sections being secured to each other in substantially axial alignment; and support means for holding said shade tube substantially upright, in surrounding relationship to a seedling.

14. A seedling protector according to claim 13 wherein said support means comprises a support tube surrounding said shade tube, and associated stake means attached to said support tube and adapted to be driven into the ground.

15. A seedling protector according to claim 14 wherein said support tube and said shade tube are in substantial peripheral engagement.

16. A seedling protector according to claim 15 wherein said support tube is constructed of open mesh material.

17. A seedling protector according to claim 13 wherein said sections are attached by adhesive.

18. A seedling protector according to claim 13 wherein said sections are attached by heat sealing.

19. A self-supporting seedling protector comprising a tubular member open at either end, said tubular member adapted to surround a seedling, and wherein said tubular member is formed of a sheet of photodegradable polyolefin material having a plurality of grid openings sized to provide a predetermined degree of shade protection by prohibiting a predetermined percentage of solar radiation from reaching the seedling.

20. A seedling protector according to claim 19 wherein positioning means are provided for facilitating ground anchoring of said tubular member.

21. A seedling protector according to claim 19 wherein said tubular member provides multiple degrees of shade protection.

* * * * *